United States Patent
Peake et al.

(10) Patent No.: US 10,349,573 B2
(45) Date of Patent: Jul. 16, 2019

(54) IMPLEMENT GUIDANCE

(71) Applicant: Trimble Inc., Sunnyvale, CA (US)

(72) Inventors: John W. Peake, Mountain View, CA (US); Stephan Pleines, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 917 days.

(21) Appl. No.: 14/293,739

(22) Filed: Jun. 2, 2014

(65) Prior Publication Data
US 2015/0342110 A1 Dec. 3, 2015

(51) Int. Cl.
A01B 69/00 (2006.01)
G05D 1/02 (2006.01)
A01B 69/04 (2006.01)
A01B 79/00 (2006.01)

(52) U.S. Cl.
CPC .......... *A01B 69/008* (2013.01); *A01B 69/004* (2013.01); *A01B 79/005* (2013.01); *G05D 1/0212* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 6,377,889 B1 | 4/2002 | Soest | |
| 6,549,849 B2 | 4/2003 | Lange | |
| 6,609,065 B1 | 8/2003 | Lange | |
| 7,363,154 B2 | 4/2008 | Lindores | |
| 7,383,114 B1 | 6/2008 | Lange | |
| 8,131,415 B2 | 3/2012 | Peake | |
| 8,494,726 B2 | 7/2013 | Peake | |
| 2006/0282205 A1 | 12/2006 | Lange | |
| 2008/0004778 A1 | 1/2008 | Rekow | |
| 2008/0086249 A1* | 4/2008 | Lange | A01B 15/20 701/41 |
| 2008/0249692 A1* | 10/2008 | Dix | A01B 69/008 701/50 |
| 2009/0099730 A1* | 4/2009 | McClure | A01B 69/008 701/41 |
| 2009/0118904 A1 | 5/2009 | Birnie | |

(Continued)

FOREIGN PATENT DOCUMENTS

| | | |
|---|---|---|
| EP | 2141565 A2 | 1/2010 |
| WO | 2008118027 A2 | 10/2008 |

OTHER PUBLICATIONS

T. Fraichard and A. Scheuer, "From Reeds and Shepp's to Continuous-Curvature Paths", IEEE Transactions on Robotics, v. 20, p. 1025, Dec. 2004.

(Continued)

*Primary Examiner* — Kevin P Mahne
(74) *Attorney, Agent, or Firm* — Kilpatrick Townsend & Stockton

(57) ABSTRACT

Efficient towed implement guidance to a desired path is achieved by guiding a towing vehicle toward a path on the opposite side of a desired path, then guiding the vehicle back to the desired path. Efficient forward implement guidance to a desired path is achieved by guiding a pushing vehicle along a tractrix. A vehicle leaves a straight line along a tractrix to keep a rear implement on the line as long as possible.

26 Claims, 18 Drawing Sheets

(56) References Cited

U.S. PATENT DOCUMENTS

| | | | |
|---|---|---|---|
| 2009/0326763 A1* | 12/2009 | Rekow | A01B 69/006 701/42 |
| 2010/0023229 A1* | 1/2010 | Chiocco | A01B 69/003 701/50 |
| 2010/0084147 A1 | 4/2010 | Aral | |
| 2011/0118926 A1 | 5/2011 | Peake | |
| 2012/0296529 A1* | 11/2012 | Peake | A01B 69/008 701/50 |
| 2012/0312617 A1* | 12/2012 | Makisalo | B60D 1/665 180/204 |
| 2013/0304300 A1 | 11/2013 | Peake | |

OTHER PUBLICATIONS

D. Wilde, "Computing Clothoid Segments for Trajectory Generation", IEEE/RSJ International Conference on Intelligent Robots and Systems, p. 2440, Oct. 2009.

International Search Report and Written Opinion of the International Searching Authority in PCT/US2015/033056, dated Nov. 20, 2015.

* cited by examiner

IMPLEMENT GUIDANCE

RELATED APPLICATIONS

This application is related to "Implement guidance", U.S. Ser. No. 14/293,781, filed on Jun. 2, 2014.

TECHNICAL FIELD

The disclosure is related to agricultural autopilots for vehicles that pull or push farm implements.

BACKGROUND

Modern farm tractors, guided by autopilots, maneuver across farm fields with position accuracy and repeatability better than an inch. Automatic, precise vehicle control saves time and energy compared to sloppy operating. It allows farmers to work more efficiently and spend less money on fertilizers and pesticides. Consumers enjoy lower prices for high quality produce, and farm chemical waste and runoff are reduced.

One of a tractor's primary tasks is pulling implements such as disks, mulch rippers, chisel plows, air seeders, box drills, planters, and the like, across fields in a uniform pattern of parallel lines. These operations are often begun from an initial "A to B" (or simply "AB") line. A set of lines parallel to the AB line defines how the tractor covers a field. Before real work can begin, the tractor and whatever implement it is pulling must both be established precisely on the AB line. Guiding a large implement onto a line efficiently is not as easy as it sounds for either a human operator or an autopilot.

Although an autopilot efficiently guides a tractor to a line, an implement towed behind takes a long time (and distance) to become established on the line within required tolerances. One technique that has been tried to overcome this problem is to tune autopilot feedback parameters such that the tractor tends to overshoot when joining a desired path. When the tractor overshoots, the implement arrives at the desired path sooner. (An analogous maneuver is performed by a tractor-trailer driver who intentionally overshoots a turn at a street corner. He drives the tractor to ensure that the trailer gets to its lane promptly rather than jumping the curb and only slowly approaching where it is supposed to go.)

Overshoot provoked by tuning feedback gains in an autopilot is not easily controllable, however; there is no way to select an amount of overshoot for instance. Furthermore, changing feedback gain to provoke overshoot can render the tractor unable to stay on its desired path reliably. It also does not prevent undesirable actions such as jack-knifing; i.e. allowing the angle between tractor and implement to become too large.

Other implement guidance challenges include guiding forward, pushed implements onto a line, and guiding rear implements along a line as long as possible as vehicle pulling them leaves a line.

What are needed are autopilots for farm tractors (or any kind of vehicle) that guide the tractor so that towed implements, fixed rear implements or fixed forward implements join or leave desired paths efficiently, subject to constraints of good behavior such as not breaking draw bars, implements, etc.

DETAILED DESCRIPTION

Implement guidance systems and methods described below guide a vehicle such that an implement towed or pushed by the vehicle performs a desired maneuver, such as joining or leaving a desired path, efficiently. Normally the goal is to keep an implement on a desired path as much as possible—joining a path as soon as possible, or staying on the path as long as possible. The systems and methods ensure that constraints, such as maximum allowed angle between vehicle and implement, maximum vehicle curvature or maximum vehicle curvature rate, are obeyed. Usually the intended vehicle is a farm tractor and the implement is a farm implement such as a plow or seeder. However, implement guidance is also applicable in other scenarios involving construction vehicles, mining trucks, army tanks, etc. Hence, as used herein the word "tractor" or vehicle may refer to any vehicle that pushes or pulls an implement. In many of the examples below a farm tractor with steerable front wheels is used for purposes of illustration. However, the techniques described for an autopilot guiding a vehicle are equally applicable to vehicles with rear steerable wheels, articulated vehicles or tracked vehicles.

In the case of towed implements, efficient implement guidance to a desired path is achieved by guiding a towing vehicle toward a path on the opposite side of the desired path, then guiding the vehicle back to the desired path. The desired path may be a straight line, a circle or an arbitrary curve. A path that is on the opposite side of the desired path from the vehicle's initial position is called an "offset path". The perpendicular distance between the desired path and the offset path is called the "offset" or "overshoot". Implement guidance systems estimate a required offset, guide a vehicle toward the offset path, and guide the vehicle back to the desired path. The value of the offset or overshoot is predetermined for each maneuver.

In most cases the vehicle path only touches the offset path at one point. (In that case the offset path may contain only a single point or be represented by an offset distance.) In some cases the vehicle never reaches the offset path. In other cases, the vehicle may drive along the offset path for a short distance in cases where the maximum vehicle overshoot from the desired path is restricted.

If an implement is steerable, then its implement steering may be used to keep it on a path designed for a passive, non-steerable implement. Implement steering is generally capable of only small corrections, however. Normally implement steering is engaged only when an implement is already on or close to a desired path.

A vehicle or implement has "reached" a path (or is established "online") when it remains within some fixed error distance from the path. (A vehicle or implement that merely crosses a path, but does not stay near it is not online.) A vehicle may be said to have "reached" a path when it stays within two centimeters of the path, as an example.

Figure 1A:
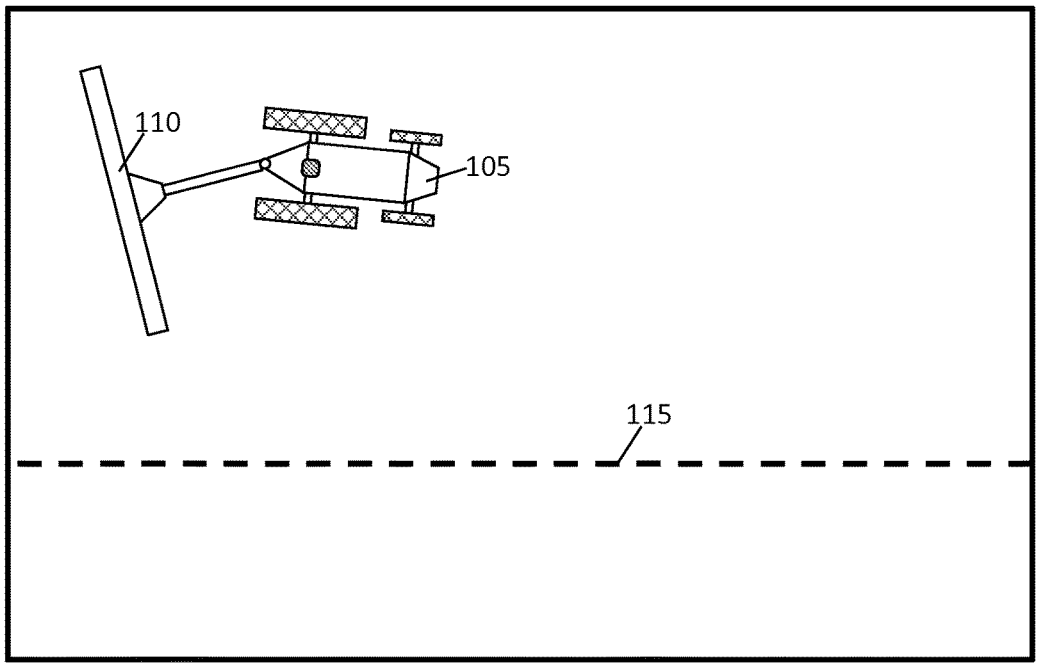
FIG. 1A shows a tractor towing an implement, and a desired path.
Figure 1B:
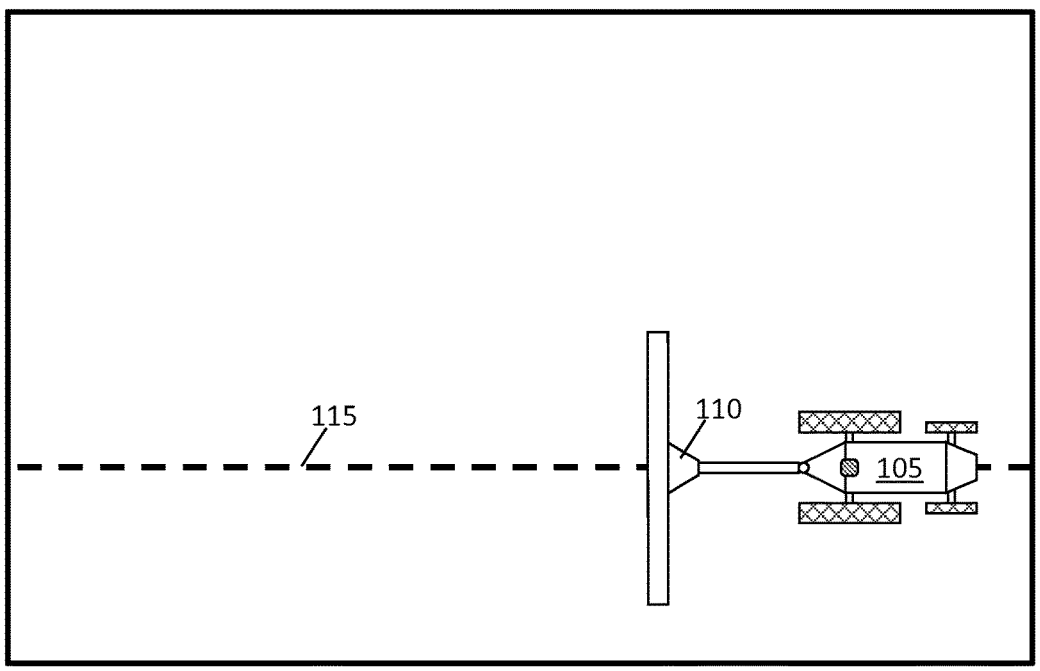
FIG. 1B shows a tractor towing an implement on a desired path.

FIG. 1A shows a tractor 105 towing an implement 110, and a desired path 115. The situation shown in FIG. 1A is a typical initial condition for implement guidance: a tractor and implement are in an arbitrary position and configuration. The position and configuration of the tractor may be described by coordinates (x, y), heading ($\phi$), and curvature ($\theta$). The configuration of the implement may be described by the position of its attachment point to the tractor and its heading. FIG. 1B shows tractor 105 towing implement 110 on desired path 115. The situation shown in FIG. 1B is the desired result of implement guidance: the tractor and implement are both on the path; their heading is parallel to the path; and their curvature or steering angle is zero.

There are at least two broad classes of autopilot that may be used to guide a tractor and its implement onto a desired path: feedback autopilots and path-planning autopilots. Feedback autopilots use feedback control loops (e.g. a proportional-integral-derivative or "PID" controller) to minimize error signals. A feedback autopilot may be designed to minimize cross-track error ("XTE") and heading error, for example. (XTE is the distance from a vehicle to the nearest point on a desired path.) A path planning autopilot creates an efficient joining path that takes the vehicle from an arbitrary initial configuration (y, $\phi$, $\theta$) to a desired path. The initial configuration may be near or far from the desired path. After the joining path is created, the vehicle follows it to the desired path.

Figure 2:
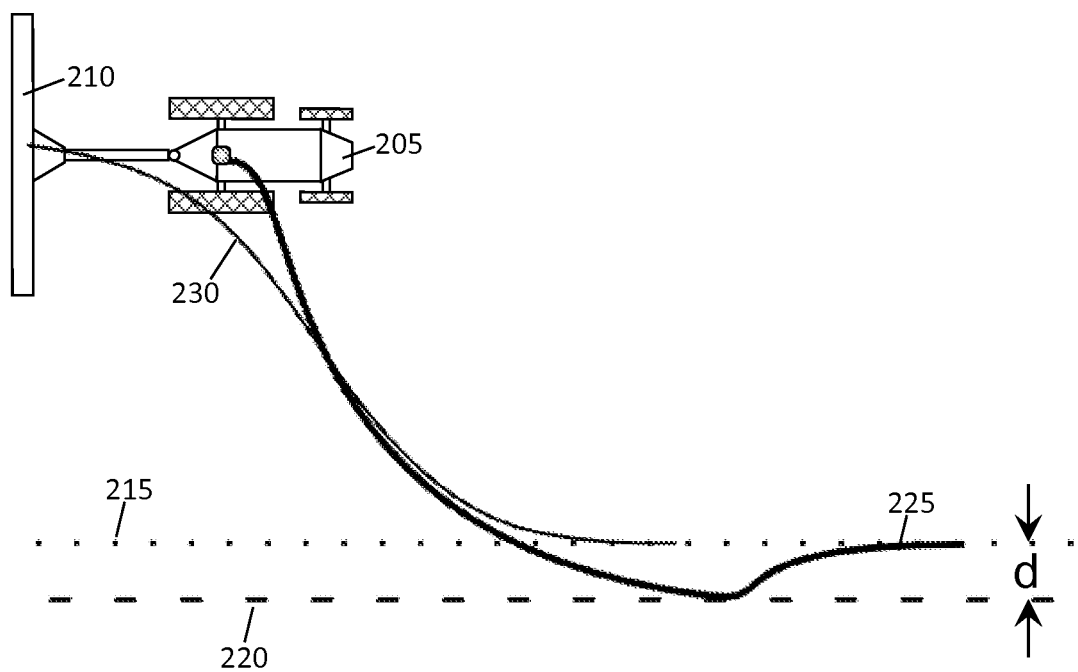
FIG. 2 shows a tractor, controlled by a feedback autopilot, towing an implement to a desired path.

Implement guidance techniques may be performed by either feedback or path-planning autopilots. In the case of a feedback autopilot, the overall procedure involves guiding the vehicle toward the offset path, the vehicle crossing the desired path, and guiding the vehicle back to the desired path. As an example, FIG. 2 shows a tractor 205, controlled by a feedback autopilot, towing an implement 210 to a desired path, dotted line 215. Offset path 220 is represented by a dashed line. It is offset from the desired path by offset "d". Heavy solid line 225 shows the path taken by tractor 205 under feedback autopilot control while light solid line 230 shows the path taken by implement 230 as it is towed by the tractor.

When a feedback autopilot guides a vehicle toward an offset path, the offset is a predetermined constant. It is known before the vehicle reaches the path. Vehicle/implement simulations may be used to predict the results of different offsets. An offset that is either too big or too small leads to an implement joining a desired path slower than necessary. A simulation may be repeated with different offsets to find an optimal offset value. Simulations estimate vehicle and implement paths based on: feedback autopilot inputs and characteristics (e.g. gain settings), a vehicle model, and an implement model.

Figure 3A:
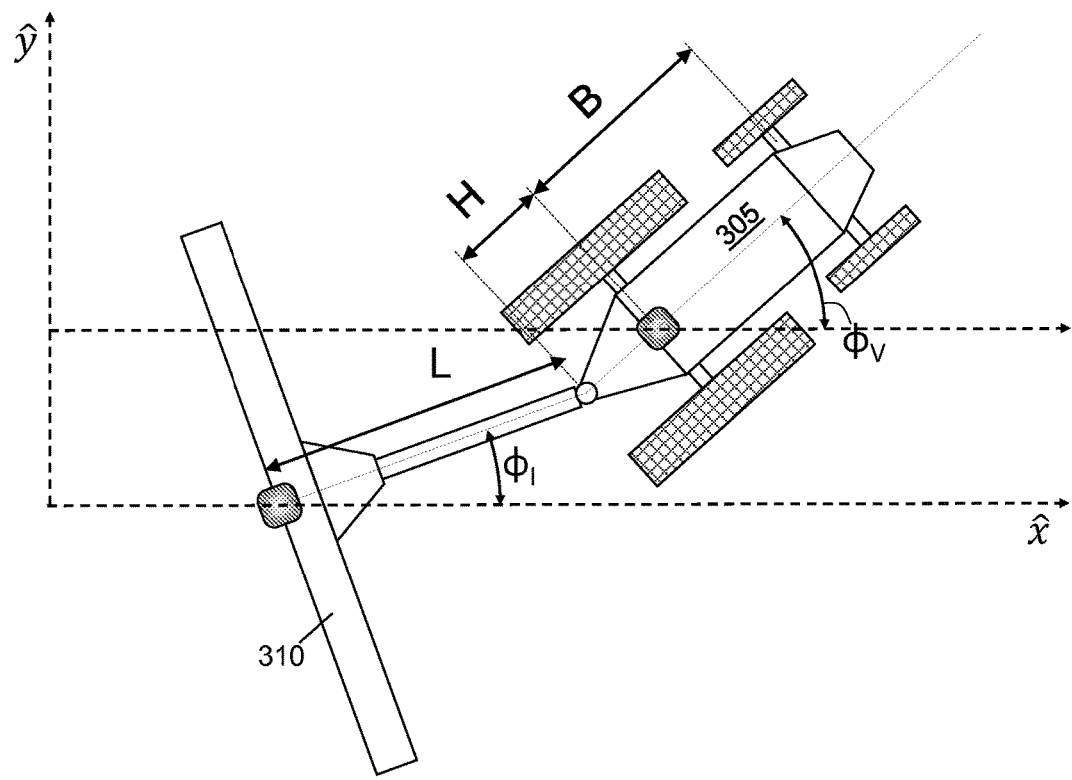
FIG. 3A shows a tractor towing an implement, and various parameters associated with modeling tractor and implement behavior.

FIG. 3A shows a tractor 305 towing an implement 310, and parameters associated with modeling tractor and implement behavior. In the figure, the wheelbase of the tractor is labeled "B", the hitch length "H", and the implement length "L". Tractor heading is denoted $\phi_V$ and implement heading is $\phi_I$. Heading angles are measured with respect to the $\hat{x}$ direction. Given these parameter definitions, an example of an implement model (where H=0) is:

$$\frac{d}{dt}\phi_I = -\frac{v}{L}\sin(\phi_I - \phi_V)$$

Here v is vehicle speed. The equation may be used to predict implement heading and path traveled given a vehicle path. When H≠0, computer simulations may be used. A vehicle path may be predicted given feedback autopilot gains and vehicle parameters such as maximum curvature and maximum curvature rate.

Appropriate offsets may be estimated for each vehicle—implement combination and these offsets may be stored in a memory accessible to the autopilot. The offset that leads to an implement joining a desired path as soon as possible depends on factors including: hitch length H, implement length L, vehicle curvature and curvature rate, and initial states of a towing vehicle (y, $\phi_V$, $\theta$) and implement $\phi_I$. In the absence of better information, a useful starting value for offset is approximately 30% of L; i.e. any value between 25% and 35% of L.

On the way toward the offset path, the vehicle crosses the desired path. Upon reaching the offset path, the vehicle is guided back to the desired path. In most cases the vehicle only touches the offset path at one point. It does not drive along the offset path. (Exceptions to this behavior are discussed below in connection with situations where the maximum offset value is restricted.)

In an alternate embodiment a vehicle is guided across the desired path as before, but the offset path is set far away so that the vehicle never reaches it. In this case, the criteria for the vehicle to turn back to the desired path is that the implement has reached the desired path; i.e. the implement is within a predetermined error distance from the desired path and is predicted to stay within that distance. This saves the work of estimating an optimal offset. (Predicting whether or not an implement stays within an error distance from a desired path after initially getting that close to it may also be skipped at the risk of unpredictable results in some cases.)

One way to direct a feedback autopilot to an offset path, whether a computed distance from the desired path or far away, is to add the amount of the offset to the autopilot's cross track error. For example, if a vehicle is 5 meters from a desired path, then the cross track error is 5 meters. One way to set a 1 meter offset is to add 1 meter to the autopilot's cross track error.

Figure 3B:
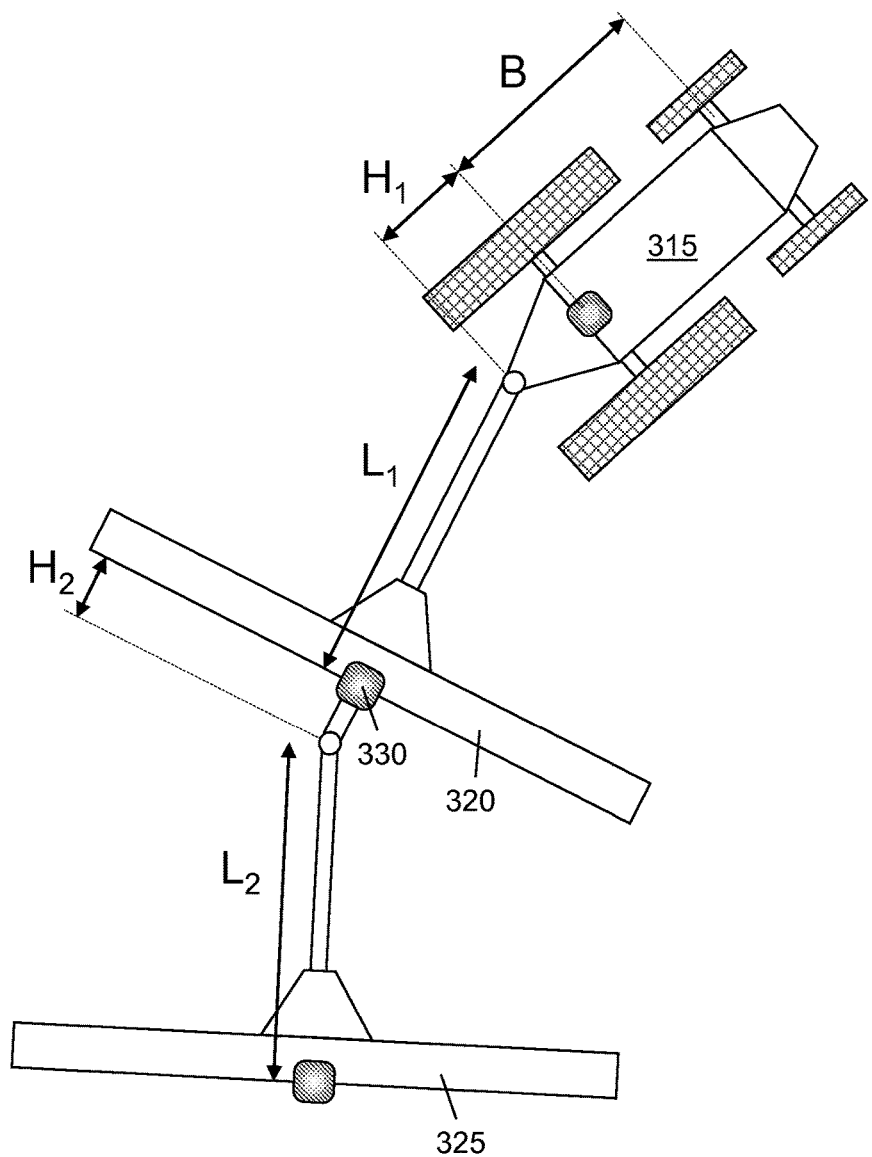
FIG. 3B shows a tractor towing a chain of two implements.

Guidance methods for a vehicle towing a single implement are also applicable to a vehicle towing a chain of implements such as illustrated in FIG. 3B which shows a tractor towing a chain of two implements. In FIG. 3B, tractor 315 tows implement 320 which in turn tows implement 325. The tractor's wheelbase is "B" and its hitch length is "$H_1$". The length and hitch length of implement 320 are "$L_1$" and "$H_2$", and the length of implement 325 is "$L_2$", as shown in the figure.

A few different strategies may be used with chains of implements. One strategy is to plan a tractor path to affect the behavior of the first implement in a chain (e.g. 320) and let subsequent implement follow with no attempt to control them. A second strategy is to treat the control point 330 of the first implement as the (control point of the) "vehicle" and to guide this "vehicle" such that the second or subsequent implement behaves in a desired manner, such as joining a desired path as quickly as possible. Depending on the strategy chosen, the first or second (or subsequent) implement can be made to join a desired path at the same time as the towing vehicle. A compromise strategy has the first implement joining a desired path too early and the second implement joining too late.

Figure 4:
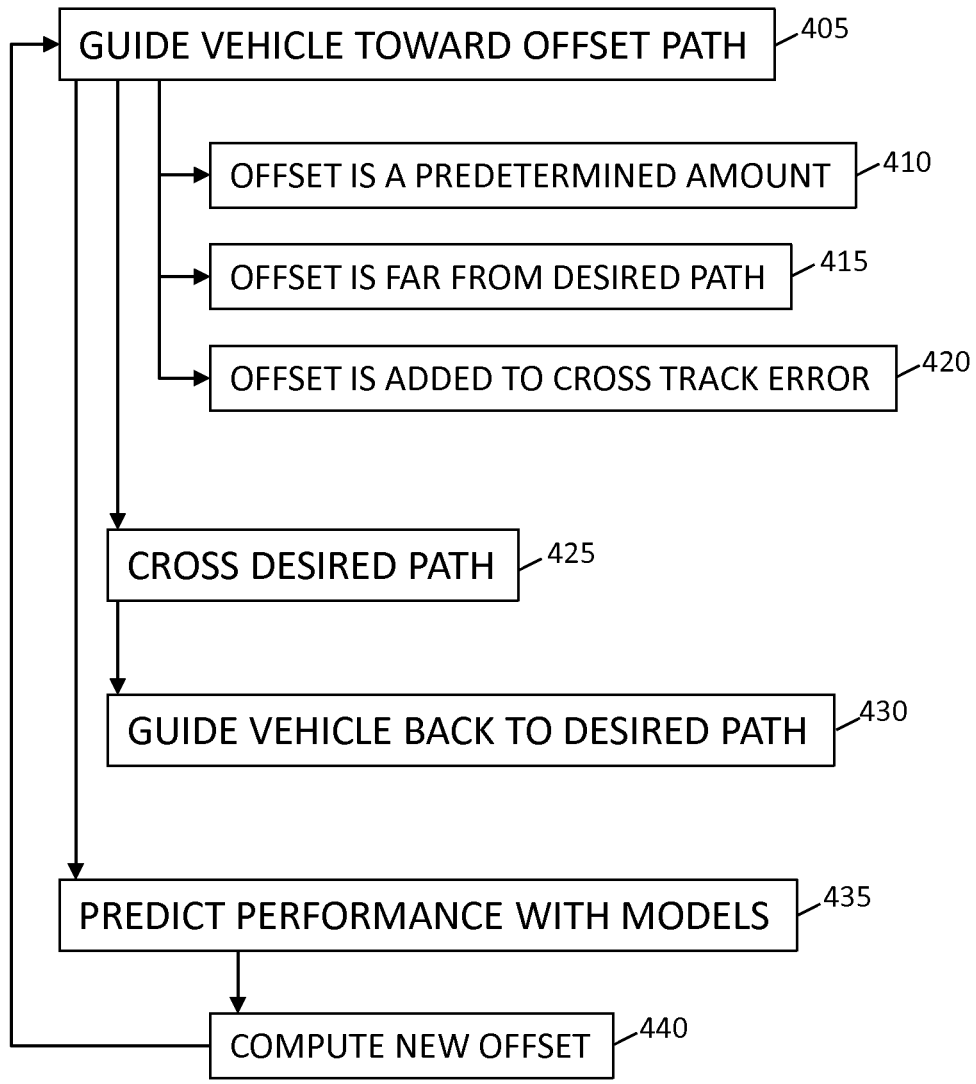
FIG. 4 is a flow chart for a method of towing an implement onto a desired path with a vehicle controlled by a feedback autopilot.

FIG. 4 is a flow chart for a method of towing an implement onto a desired path with a vehicle controlled by a feedback autopilot. The flow chart summarizes techniques just described. In FIG. 4, step 405 is "guide vehicle toward offset path". The offset path may be just one point or it may be represented by an offset distance from the desired path. Step 425 is "cross desired path". This means that the vehicle crosses the desired path so that the implement arrives at the desired path sooner than if the vehicle did not cross it. Step 430 is "guide vehicle back to desired path". Once the implement has reached the desired path, the vehicle must return to the desired path so that the desired configuration (see FIG. 1B) can be achieved.

Steps 410, 415 and 420 are options pertaining to guiding the vehicle toward the offset path. These steps are not all performed together. Step 410 represents the option that the offset is a predetermined amount obtained from a stored valued in memory, from trying different offset amounts in simulation, or from a rule of thumb such as 30% of L, as examples. Alternatively, step 415 represents the option that the offset is set far away from the desired path; in other words it is farther away from the desired path than the vehicle needs to go to bring the implement online in minimum time. Finally, step 420 represents the option that the effect of an offset path is created by adding an offset to the cross track error in a vehicle's feedback autopilot.

Steps 435 and 440 are "predict performance with models" and "compute new offset". Predicting performance means simulating vehicle and implement paths given initial conditions, vehicle and implement characteristics, and offset values. Offset values may be computed based on simulation results with previous offsets. For most initial conditions, if an implement becomes established online before the vehicle, then the offset is too big; if the vehicle arrives online first, then the offset is too small.

Implement guidance may also be performed with a path planning autopilot. Unlike conventional autopilots, a path planning autopilot offers direct control over constraints such as maximum permitted steering angle or maximum steering angle rate. Such constraints may be specified as functions of vehicle speed. Path planning techniques may be implemented as a complementary feed-forward capability of a feedback autopilot or they may replace feedback all together.

Several kinds of path planning autopilots exist. An advanced path planning autopilot accepts heading, curvature and curvature rate constraints. Such an autopilot is described in "Path planning autopilot", U.S. patent application Ser. No. 13/470,028, filed on May 11, 2012 and incorporated herein by reference. A more limited path planning autopilot (which may also be viewed as a special case of the advanced path planning autopilot) cannot account for curvature rate constraints. This kind of autopilot plans paths that include straight lines and circular arcs, but not clothoid segments. Such an autopilot does not guide a vehicle as smoothly as one that obeys curvature rate constraints, but it may be adequate for slow speed maneuvers. A still more limited system is one that lays out an objective or series of objectives, other than the vehicle desired path, for a feedback autopilot.

When a path planning autopilot performs implement guidance it computes a first optimal vehicle path from an initial condition to an offset path. It then computes a second optimal path to join a desired path from the offset path. (If the offset path is close to the desired path, however, path planning from the offset path back to the desired path may not be necessary; feedback may be sufficient.)

The first optimal path starts from the vehicle's initial condition which is specified by its perpendicular distance, y, from the desired path, its heading, $\phi$, and its curvature, $\theta$. The first optimal path ends at the offset path with (y, $\phi$, $\theta$)=(–d, 0, $\theta_M$). Here, d is the amount of offset and $\theta_M$ is a specified curvature upon reaching the offset path. At the offset path y=–d because the offset path is on the opposite side of the desired path from the vehicle's initial position. The second optimal path starts from (–d, 0, $\theta_M$) and ends on the desired path with (y, $\phi$, $\theta$)=(0, 0, 0).

Both the first and second optimal paths obey curvature ($\theta$) constraints. The paths also obey curvature rate ($d\theta/dt$) constraints if the path planning autopilot is capable of taking them into account. Furthermore, the optimal paths obey implement constraints such as maximum implement angle, $|\phi_I-\phi_T|$, maximum implement curvature and maximum implement curvature rate. ("Optimal" paths are optimal in theory and efficient in practice.)

Figure 5:
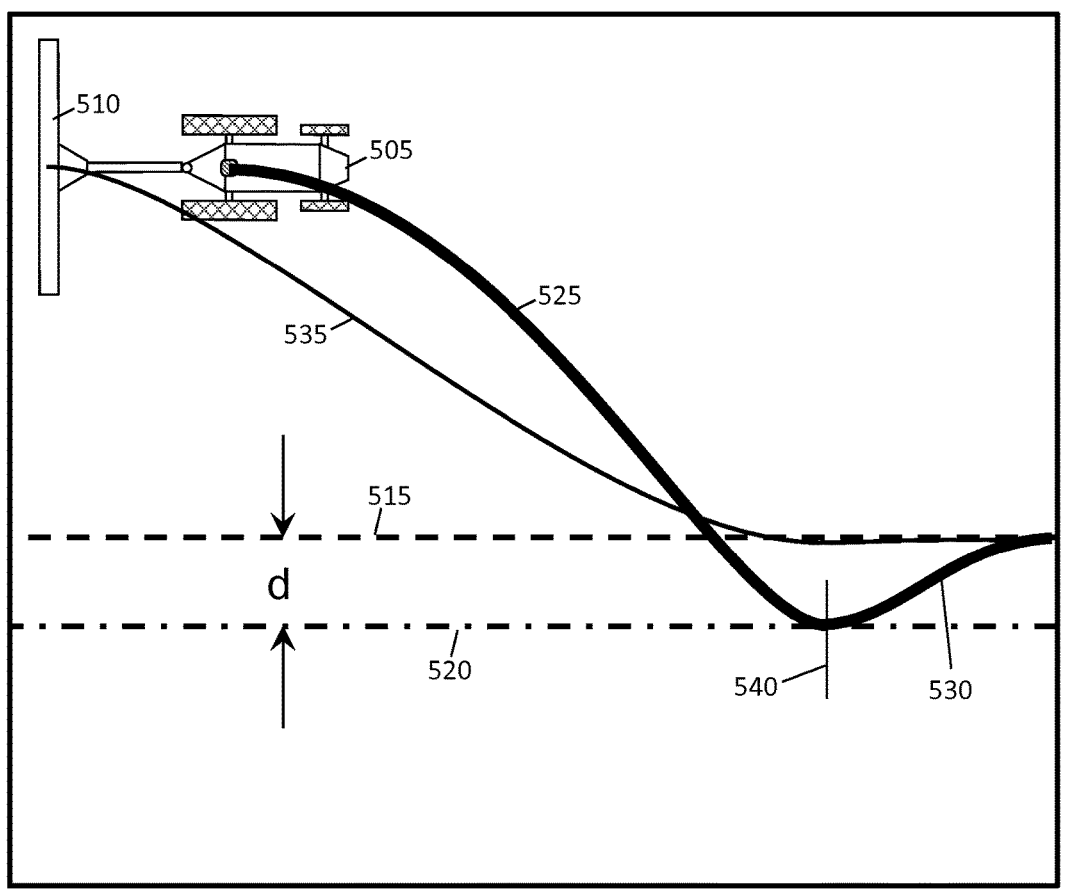
FIG. 5 shows a tractor, controlled by a path-planning autopilot, towing an implement to a desired path.

FIG. 5 shows a tractor 505, controlled by a path-planning autopilot, towing an implement 510 to a desired path 515 represented by a dashed line. Offset path 520 is represented by a dash-dot line and is separated from the desired path by offset, d. The optimal path estimated by the path planning autopilot and followed by the tractor is composed of two parts: a first optimal path 525 from the tractor's initial position to the offset path and a second optimal path 530 from the offset path to the desired path. Vertical line 540 marks the boundary between lines 525 and 530. The path followed by implement 510 is drawn as line 535. While FIG. 5 is a conceptual sketch, FIGS. 6 and 7, described below, are results of path planning simulations.

Turning now to details of path planning for implement guidance, the first step is choosing an offset amount, d. In the absence of other information a good first guess for the offset is 30% of L, the implement length. Next, the curvature, $\theta_M$, needed at the offset path is estimated. This can be done analytically (e.g. using the methods of U.S. Ser. No. 13/470, 028) or by lookup table. If $\theta_M$ is too large, the vehicle will overshoot the desired path when returning from the offset path. If $\theta_M$ is too small, the vehicle will join the desired path slower than necessary. Once $\theta_M$ is chosen, an optimal path is planned from the vehicle's present condition (y, $\phi$, $\theta$) to the offset path $(-d, 0, \theta_M)$. Finally, an optimal path is planned from the offset path to the desired path $(0, 0, 0)$. These steps are repeated with different offsets until an offset is found that minimizes the distance required to bring the implement online. (This distance may be the total distance travelled by the vehicle or implement, or an along-track distance parallel to the desired path.) A binary search may be used to find the best offset.

In most cases the best offset is the one that results in the vehicle and implement arriving online at the same time. If the implement arrives first, the offset is too big; if the vehicle arrives first, the offset is too small. Exceptions can occur for unusual initial conditions such as vehicle and implement on opposite sides of the desired path.

Path planning implement guidance results vary depending upon initial vehicle and implement conditions. An implement model may be used to predict implement behavior, but the model needs initial conditions for the implement as input. There are several possible ways to estimate the initial condition of the implement without any direct sensor for implement position. One way is to assume that the implement trails straight behind the vehicle; i.e. $\phi_I = \phi_V$. Although this assumption may not be correct, it can still lead to useful results as path planning solutions tend to converge as paths become longer. A second way is to assume an implement heading based on the tractor's steering angle. A third way to estimate the implement's condition is based on vehicle history (the path it has taken in the recent past) and an implement model. Finally, if GPS, inertial, or mechanical sensors are available, then these may be used to estimate implement position and/or heading.

Once a vehicle path has been computed that brings the implement online as fast as possible, the path is checked to make sure it does not cause the implement to violate implement constraints. (By design the path does not violate vehicle constraints.) For example the implement may be restricted to maximum curvature or the angle between the implement and the vehicle $|\phi_I - \phi_V|$ may be restricted to a maximum value to prevent jack-knifing. If implement constraints are violated, then maximum vehicle curvature and/or maximum vehicle curvature rate may be reduced and all paths recomputed with new vehicle constraints.

As a final check, implement performance may be compared for a vehicle path using a computed offset and a vehicle path using zero offset. In certain special cases, e.g. vehicle and implement on opposite sides of desired path, the latter may prove to bring the implement online faster. If that is the case, then the zero offset solution is used.

FIGS. 6A, 6B, 7A and 7B show computed vehicle (heavy line) and implement (light line) paths for various offsets (i.e. "overshoot"). In each case the initial vehicle condition is (5 m, 0, 0), H=1 m, and L=5 m. The desired path is the dotted line, y=0. The offset path is drawn as a dot-dash line.

Figure 6A:
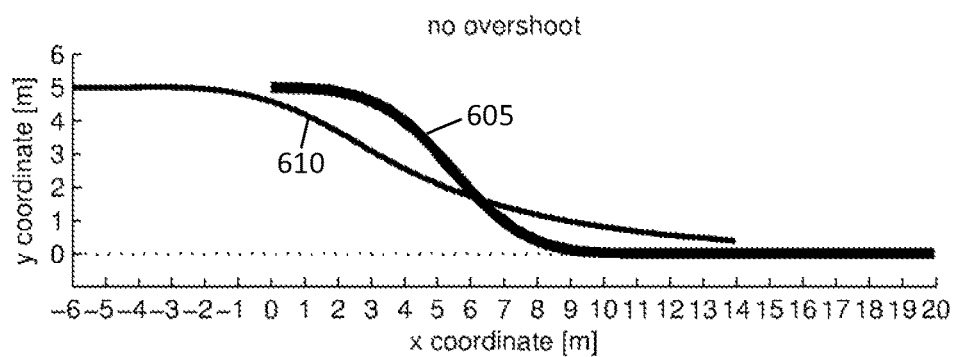
FIGS. 6A and 6B illustrate tractor and implement paths for cases of no overshoot and too much overshoot, respectively.
Figure 6B:
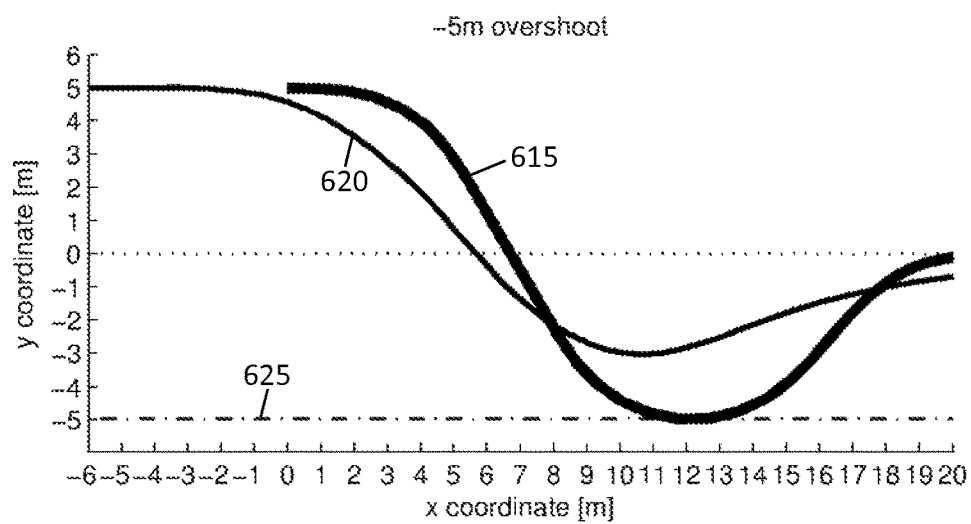

FIGS. 6A and 6B illustrate tractor and implement paths for cases of no overshoot and too much overshoot, respectively. In FIG. 6, lines 605 and 615 are tractor paths while lines 610 and 620 are corresponding implement paths. Line 625 is an offset path where the offset is 5 m.

Figure 7A:
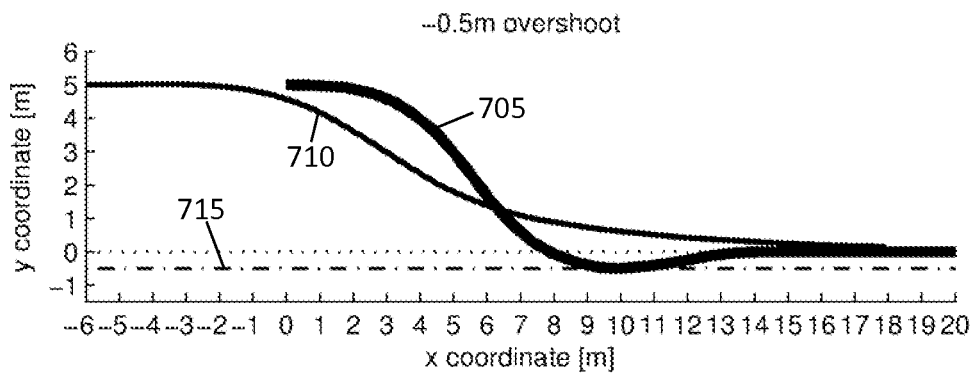
FIGS. 7A and 7B illustrate tractor and implement paths for cases of too little and optimal overshoot, respectively.
Figure 7B:
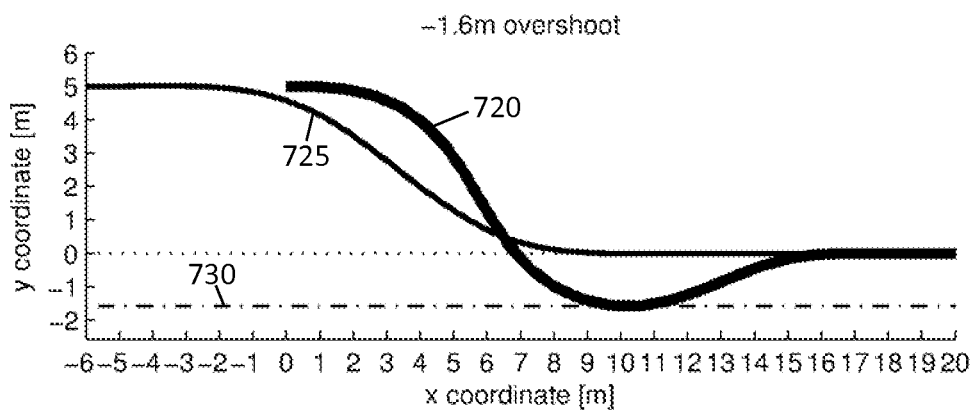

FIGS. 7A and 7B illustrate tractor and implement paths for cases of too little and optimal overshoot, respectively. In FIG. 7, lines 705 and 720 are tractor paths while lines 710 and 725 are corresponding implement paths. Lines 715 and 730 are offset paths where the offset is 0.5 m and 1.6 m, respectively.

Inspection of the figures reveals that the implement joins the desired path (y=0) soonest when the offset is 1.6 m. In this case the implement is online by approximately x=8 m. In all the other cases, the implement joins the desired path later. In particular, the implement does not join the desired path until some point after x=14 in the "no overshoot" case of FIG. 6A.

Figure 8:
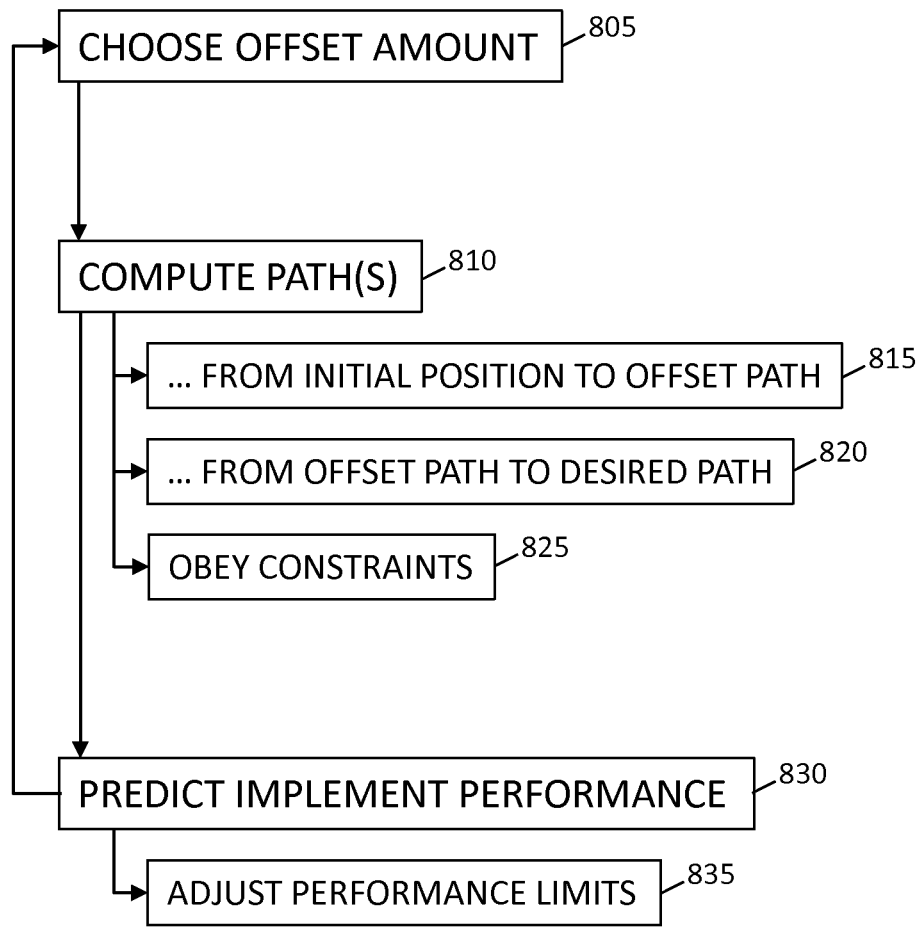
FIG. 8 is a flow chart for a method of towing an implement onto a desired path with a vehicle controlled by a path-planning autopilot.

FIG. 8 is a flow chart for a method of towing an implement onto a desired path with a vehicle controlled by a path-planning autopilot. The flow chart summarizes techniques just described. In FIG. 8, step 805 is choose offset amount; step 810 is compute path(s); and step 830 is predict implement performance. Based on the results of step 830, the three steps are repeated until the implement joins the desired path efficiently.

Details of computing paths are summarized by steps 815 (compute path from initial vehicle position to offset path), 820 (compute path from offset path to desired path) and 825 (obey vehicle constraints). Note that step 820 need not be performed if the offset path is close to the desired path and feedback, rather than path planning, is used to guide the vehicle from the offset path back to the desired path. Step 835 (adjust performance limits) refers to checking that implement constraints are not violated, and if they are, adjusting vehicle constraints to avoid exceeding implement limits. Implement constraints may include an implement never exceeding a specified maximum angle with respect to the vehicle, an implement never exceeding a specified maximum curvature, and/or an implement never exceeding a specified maximum curvature rate.

Examples of path planning autopilots capable of performing the steps of FIG. 8 were described in U.S. Ser. No. 13/470,028 and are reviewed here. Path-planning implement guidance procedures may be executed by autopilots such as these.

Figure 9:
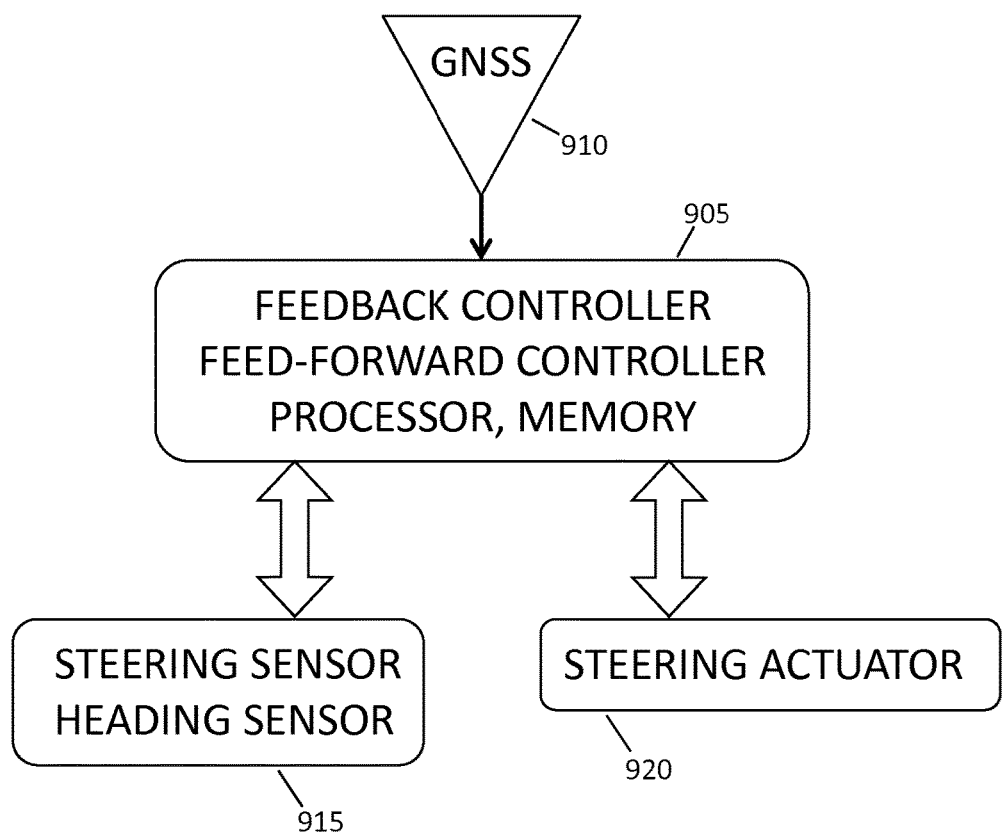
FIG. 9 is a block diagram of a path planning autopilot including feedback and feed-forward controllers.

FIG. 9 is a block diagram of a path planning autopilot including feedback and feed-forward controllers. The autopilot includes a main unit 905 having a feedback controller, a feed-forward controller, a processor and memory. Functional blocks of the main unit may be implemented with general purpose microprocessors, application-specific integrated circuits, or a combination of the two.

The main unit receives input from GNSS (global navigational satellite system) receiver 910 and sensors 915. The main unit sends output to actuators 920. GNSS receiver 910 may use signals from any combination of Global Positioning System, Glonass, Beidou/Compass or similar satellite constellations. The receiver may use differential corrections provided by the Wide Area Augmentation System and/or real-time kinematic positioning techniques to improve accuracy. The receiver provides the main unit with regular position, velocity and time updates.

Sensors 915 include steering sensors that report vehicle steering angle and heading sensors that report vehicle heading to the main unit. Heading may be sensed from a combination of GNSS and inertial measurements. Steering angle may be sensed by a mechanical sensor placed on a steering linkage or by inertial measurements of a steering linkage. Sensors 915 may also be omitted if heading and curvature of vehicle track are estimated from GNSS measurements alone.

Actuators 920 include a steering actuator to steer a vehicle. A steering actuator may turn a vehicle's steering wheel or tiller, or it may control a steering mechanism directly. On some vehicles steering actuators operate hydraulic valves to control steering linkages without moving the operator's steering wheel.

Figure 10:
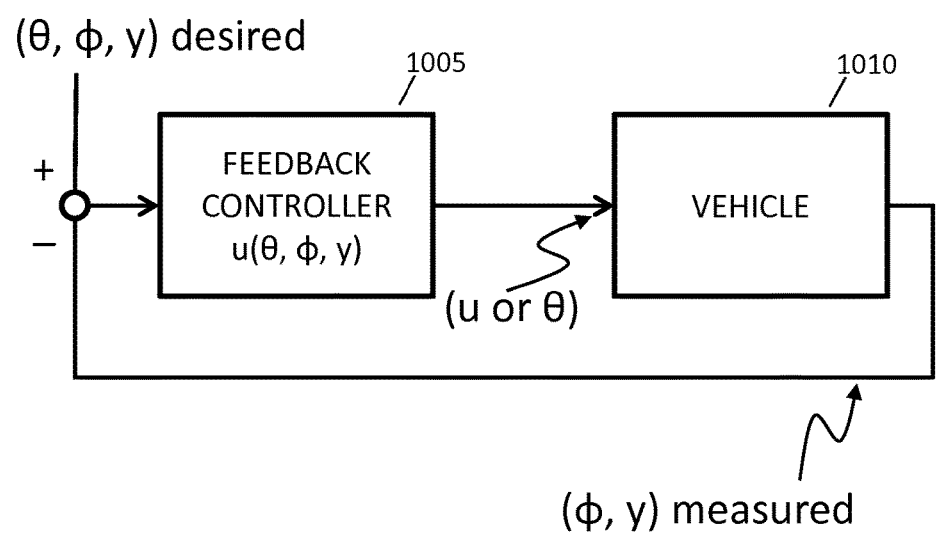
FIG. 10 is a block diagram of a feedback control system based on path planning algorithms.

A path planning autopilot may include many other functions, sensors and actuators. For simplicity, only some of those pertinent to path planning operations have been included in FIG. 9. A display and user input devices are examples of components omitted from FIG. 9. User input may be necessary for system tuning, for example. The system of FIG. 9 may operate in different modes, three of which are illustrated in FIGS. 10, 11 and 12.

A path planning autopilot may use path planning techniques in a feedback control system or it may use path planning in a combined feedback/feed-forward control system. FIG. 10 is a block diagram of a feedback control system based on path planning algorithms. In FIG. 10, feedback controller 1005 controls vehicle 1010 by sending curvature rate (u) or curvature (θ) command signals to it. Actual vehicle heading (φ) and cross track error (y) as measured by a GNSS receiver, heading sensor and/or other sensors are combined with desired curvature, heading and track (θ, φ, y) to form an error signal for controller 1005.

Figure 11:
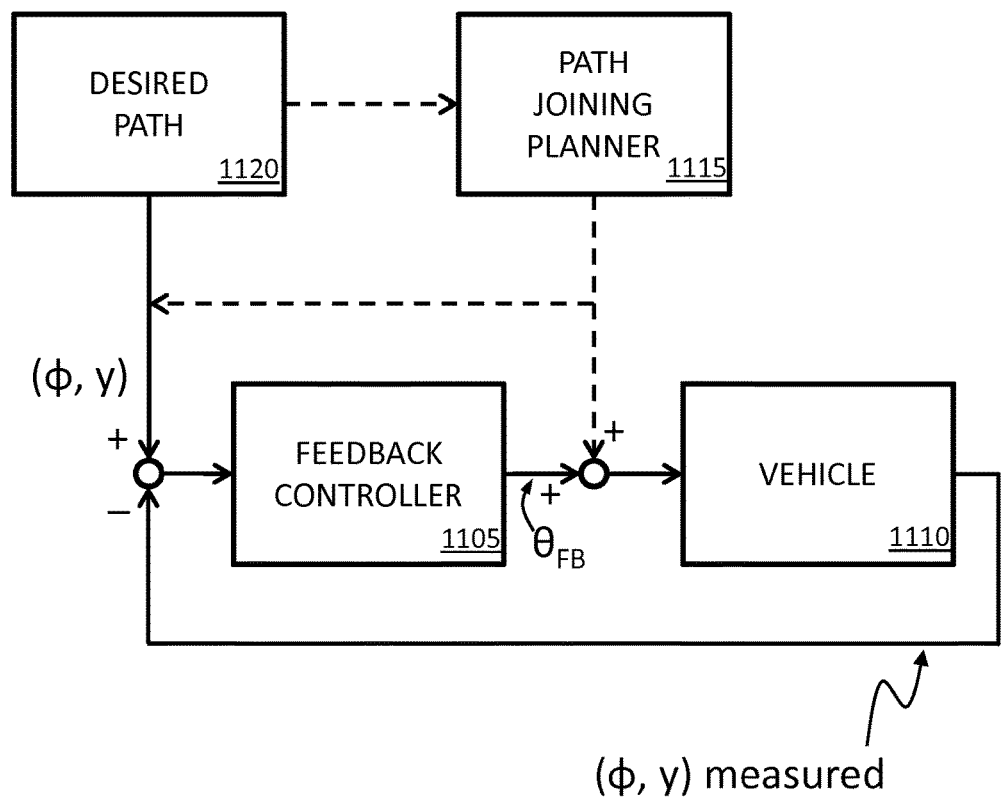
FIG. 11 is a block diagram of a feedback and feed-forward control system in feedback mode.
Figure 12:
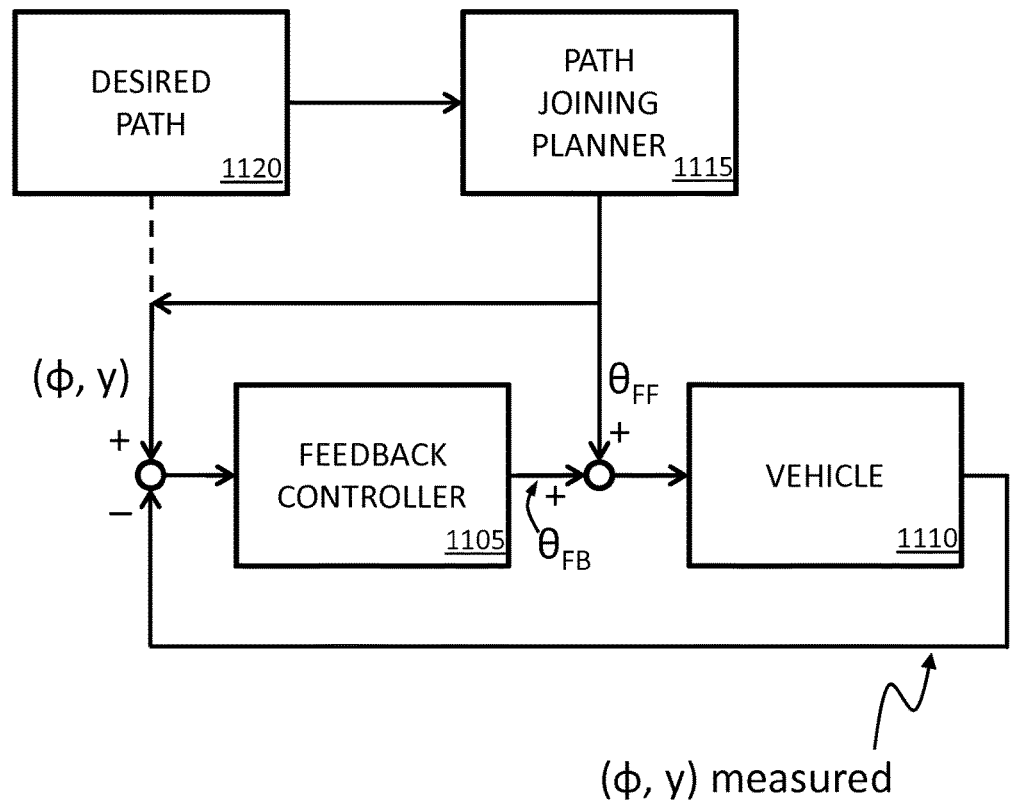
FIG. 12 is a block diagram of a feedback and feed-forward control system in combined feedback and feed-forward mode.

FIGS. 11 and 12 are block diagrams of a feedback and feed-forward control system in feedback, and combined feedback and feed-forward modes, respectively. In FIGS. 11 and 12, feedback controller 1105 controls vehicle 1110 by sending curvature (θ) commands to it. (Alternatively, feedback controller 1105 may send curvature rate (u) commands to the vehicle.) Actual vehicle heading (φ) and cross track error (y) as measured by a GNSS receiver, heading sensor and/or other sensors are combined with parameters of a desired path 1120 to form an error signal for controller 1105. Feedback controller 1105 may be a conventional PID controller unlike feedback controller 1005.

In FIGS. 11 and 12, solid arrows represent active signal paths, while dashed arrows represent signal paths that are turned off. Thus in FIG. 11, feedback controller uses an error signal derived from the difference between measured and desired paths to generate feedback control signal $\theta_{FB}$. This mode may be used when the vehicle is close to the desired path.

When the vehicle is far from a desired path, the control system switches to the mode illustrated in FIG. 12. A typical scenario in which a vehicle is far from a desired path is when an autopilot system is engaged before the vehicle is established on the path. A set of parallel swaths may have been created to guide a tractor over a farm field, for example, and the tractor operator may want the autopilot to guide the tractor to the nearest one. When this happens, path joining planner 1115 calculates an efficient path from the vehicle's present position to the desired path.

Path joining planner 1115 calculates a joining path to guide the vehicle to the desired path and provides a feed-forward control signal, $\theta_{FF}$, which is combined with feedback control signal $\theta_{FB}$ to guide vehicle 1110. For purposes of feedback controller 1105, the joining path is the desired path until the original desired path 1120 is reached. Thus feedback reference signal (φ, y) is derived from the path joining planner during that time. The path joining planner is the feed-forward mechanism described in connection with FIG. 9.

Alternatively, once path joining planner 1115 calculates a joining path, that joining path continuing onto the original desired path (from the point where the joining path meets the original path) may become the new desired path. The original desired path before the point where the joining path meets it may then be discarded.

Autopilots having a path-planning, feedback and feed-forward control system like that of FIGS. 11 and 12 may use a switch to alternate between modes. The mode is selected based on vehicle distance from desired path 1120; near the path feedback control is used, far from it combined feed-forward and feedback control is used. Criteria to determine "near" and "far" may be based on characteristic lengths such as vehicle wheelbase or distance travelled in a characteristic response time, or whether or not steering angle or steering angle rate limits are encountered.

Alternatively, a control system may operate in the mode illustrated in FIG. 12 continuously. When the vehicle is near the desired (1120) path, output signals from the path joining planner are small and may have negligible practical influence on the feedback control system. Thus, the path joining planner may be kept online all the time.

FIGS. 10-12 show measured (φ, y) data being combined with desired path data and then sent to feedback controller 1005 or 1105. However, measured data could alternatively be estimated by an observer, e.g. a Kalman filter, before being combined with desired path data.

Figure 13:
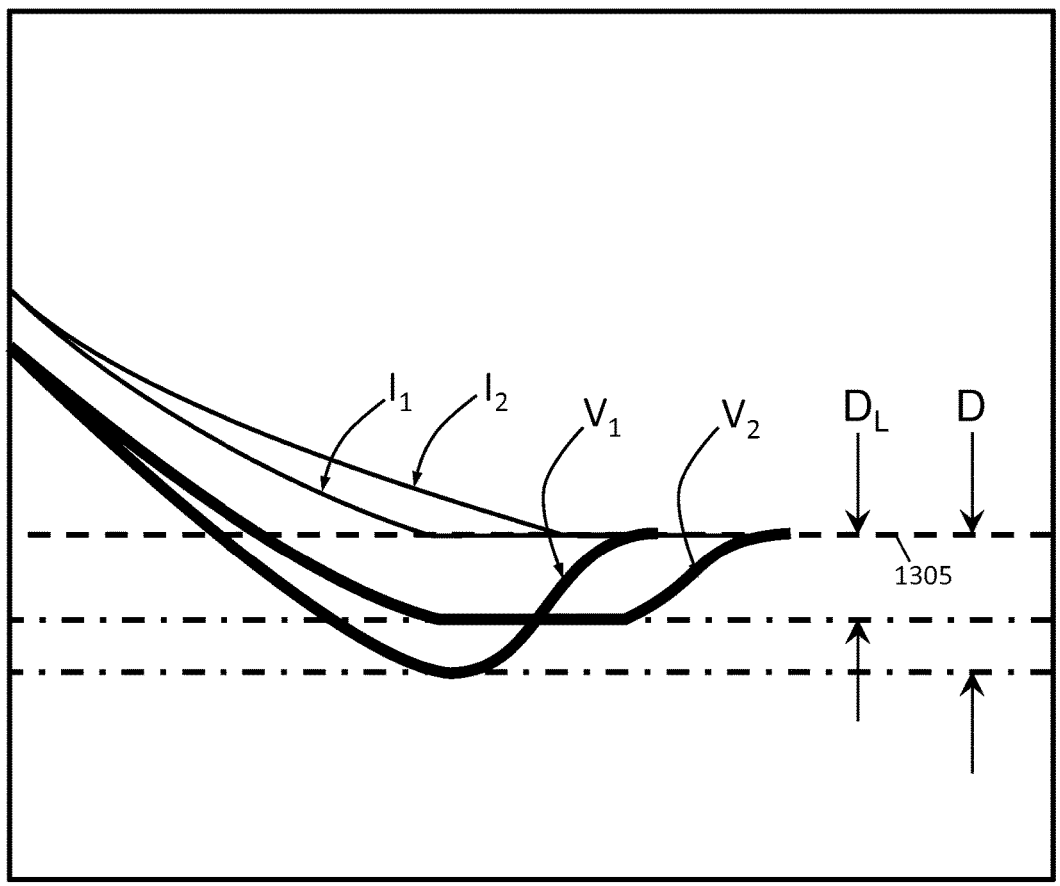
FIG. 13 illustrates tractor and implement paths when maximum permissible overshoot is restricted.

In addition to basic implement guidance, feedback or path-planning autopilots may be configured for advanced implement guidance procedures. FIG. 13 illustrates tractor and implement paths in an example where maximum permissible overshoot is restricted. Restrictions of maximum overshoot typically occur when a tractor must be prevented from driving over, and potentially crushing, a crop row adjacent to the desired path. When maximum overshoot is restricted, a towing vehicle stays on an offset path for a finite distance rather than merely touching the offset path at one point.

In FIG. 13, vehicle path $V_1$ produces implement path $I_1$, while vehicle path $V_2$ produces implement path $I_2$. Offset D is the offset associated with vehicle path $V_1$ and it results in an implement joining desired path 1305 as soon as possible. Restricted offset $D_L$ is the offset associated with vehicle path $V_2$ which results in an implement joining desired path 1305 as soon as possible given the maximum-offset constraint.

A strategy for designing offset-constrained paths such as path $V_2$ is as follows: If the implement undershoots the desired path even when the vehicle overshoots the desired path by the maximum permissible amount, then the distance travelled by the vehicle along the offset path is increased by an increment and the system is simulated again. The optimum distance for the vehicle to travel along the offset path is the one that leads to the implement and the vehicle arriving on the desired path at the same time. If the vehicle arrives on the desired path first, then the vehicle should stay on the offset path longer. On the other hand, if the implement arrives on the desired path first, then the vehicle should travel on the offset path for a shorter distance. The optimal distance for the vehicle to stay on the offset path may be estimated by iteration.

Another advanced situation occurs when operating on sloping terrain such as a side slope. When a slope is detected or anticipated, all paths may be adjusted uphill to compensate. "Agricultural autopilot path adjustment", U.S. Pat. No. 8,494,726 to Peake et al., issued on Jul. 23, 2013, and incorporated herein by reference, provides techniques for estimating the amount of uphill adjustment needed. Implement slope may be anticipated from a terrain map stored in a memory or from vehicle slope as sensed onboard a vehicle.

There are other possible methods to solve the implement guidance problem. As examples, solutions, that although not optimal may still be useful, are now discussed. The first alternate method proceeds as follows: First an optimal vehicle path is computed from the implement's position to the desired path. This optimal vehicle path now becomes the implement path. A new vehicle path is computed based on the implement path using geometric relationships between the vehicle and the implement. (See for example techniques discussed in U.S. Pat. No. 8,494,726.)

One drawback of this method is that the new vehicle path will violate constraints used in computation of the original optimal vehicle path. For example, the curvature may become greater than allowed. A solution to this is to make the original vehicle constraints more restrictive; e.g. reduce the maximum allowable vehicle curvature. Finally, the vehicle is guided along the new vehicle path.

A second alternate method proceeds as follows: First an optimal vehicle path is computed for the vehicle to join the desired path. Next an implement model is used to predict the implement's path. The implement's offset from the desired path at the point when the vehicle reaches the desired path is noted, and then the vehicle path is displaced toward the desired path by the amount of implement offset. The vehicle is then guided along the displaced vehicle path. When the implement reaches the desired path, feedback may be used to guide the vehicle from its displaced position back to the desired path.

A third alternate method is to compute a spline (b-spline, cubic spline, etc.) path from the vehicle's initial position to a desired path. A simulation of vehicle and implement behavior for the vehicle following the spline and the implement towed behind may be performed with the aid of vehicle and implement models. Spline parameters may then be adjusted iteratively to find a spline that brings the vehicle and the towed implement online simultaneously or nearly so.

Figure 14:
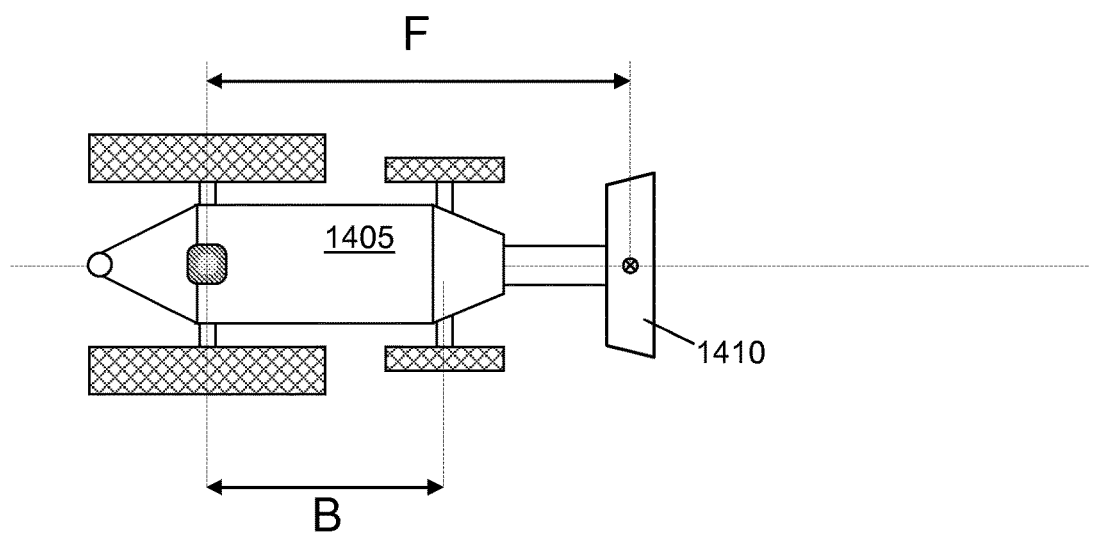
FIG. 14 shows a tractor pushing an implement.

Pushed implements also benefit from vehicle maneuvers; FIG. 14 shows a tractor pushing an implement. In FIG. 14, tractor 1405 pushes a fixed implement 1410. The implement is ahead of the tractor's control point (the center of the rear axle) by a distance F. (The control point of the implement is marked with a target symbol on the implement.) An exemplary situation is a harvester with a header fixed in front of it. Here the problem is again how to maneuver the vehicle (e.g. tractor, harvester) so that the implement arrives on a desired path as quickly as possible. And similarly to the towed implement case, it is desirable to prevent the pushed implement from going past a desired path by more than some maximum amount. Unlike a towed implement, a pushed implement is fixed; in other words it always has the same heading as the vehicle. FIG. 14 shows F greater than the vehicle's wheelbase, B. However, situations in which F=B or F<B are not uncommon.

The basic strategy for establishing a pushed implement (or "forward implement") on a desired path is: first, approach the path at less than or equal to a maximum permissible approach angle; next, starting from the point where the implement first reaches the desired path, guide the vehicle along a tractrix; finally, resume normal vehicle guidance once the vehicle is established on the desired path.

A tractrix is a curve that solves the differential equation, $$\frac{dy}{dx} = -\frac{\sqrt{a^2 - x^2}}{x}$$

with initial condition y(a)=0.
The solution is, $$y = \int_x^a \frac{\sqrt{a^2 - t^2}}{t} dt = \pm \left( a \ln \frac{a + \sqrt{a^2 - x^2}}{x} - \sqrt{a^2 - x^2} \right)$$

The first term of the solution may also be written $$\mathrm{asech}^{-1}\left(\frac{x}{a}\right)$$

and other approximations to the tractrix may be feasible depending on specific situations. Thus "tractrix" as used here refers both to the exact solution of the differential equation presented above and also to reasonable approximations to that solution such as hyperbolic functions that approach an axis asymptotically.

Figure 15:
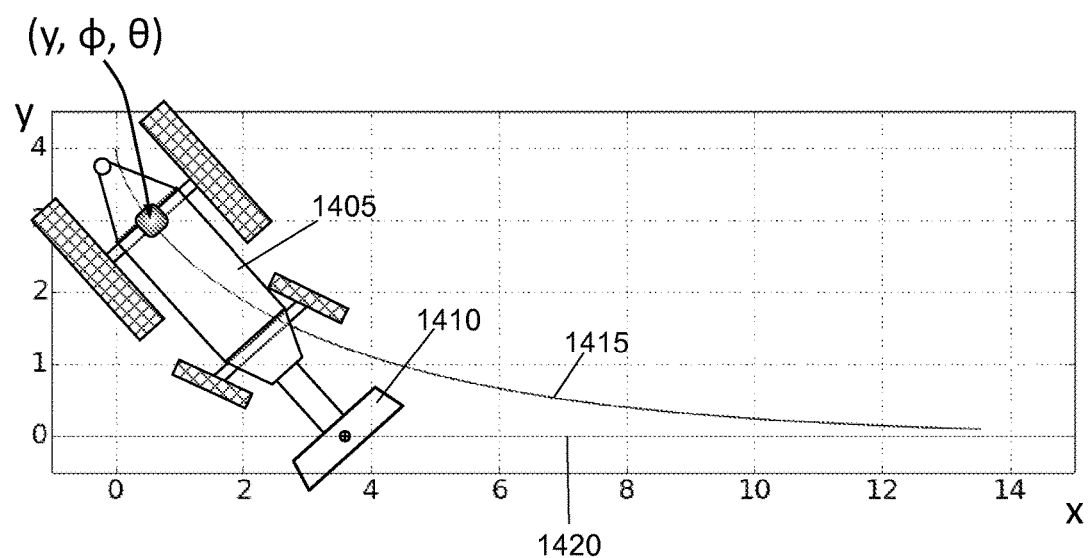
FIG. 15 shows a tractor pushing an implement to join a desired path.

FIG. 15 shows a vehicle 1405 pushing implement 1410 to join desired path 1420. The path taken by the vehicle is tractrix 1415. The control point of the vehicle, at the center of the rear axle, is the point where vehicle curvature, θ, and heading, ϕ, are computed. Note that in FIG. 15, x and y are switched compared to the equations given above to maintain consistency with earlier figures such as FIGS. 6 and 7. Using the equations, a=4 in FIG. 15, and the positive branch of the solution is shown.

From the moment that the implement arrives at the desired path, the implement path is a straight line along the desired path while the path of the vehicle control point, at the center of the vehicle's rear axle, is along the tractrix. The shape of the tractrix is such that a=F, the implement distance ahead of the control point.

If the vehicle were to approach the desired path at right angles, the implement would first arrive at the desired path when the vehicle's control point was F away from it. A tractrix with a=F provides the correct path for the vehicle to follow in this case. However, few actual vehicles can follow the tractrix from that initial condition because an instantaneous change in steering angle from zero to 90 degrees is needed.

A more reasonable solution is to specify a maximum acceptable approach angle. The vehicle shown in FIG. 15, for example, is angled approximately 45 degrees to the desired path. An advanced autopilot can plan a path from an arbitrary initial vehicle condition to a condition where the vehicle approaches at the desired path at a specified angle, $\phi_M$. The required vehicle curvature upon the implement reaching the desired path is determined by the tractrix. Thus the autopilot plans a path from an arbitrary initial condition to one in which the curvature and heading are (θ=f($\phi_M$), ϕ=$\phi_M$). Here f($\phi_M$) expresses the idea that a desired heading specifies a point on the tractrix, which in turn has a computable curvature.

A more limited autopilot may not take curvature rate constraints into account. In this case, a path may be planned from an arbitrary initial condition to a straight line approach to a desired path at a desired angle. When the implement reaches the desired path, the vehicle curvature is changed to the curvature required by the tractrix as quickly as possible. This method may be adequate depending on vehicle speed and selected approach angle. At slow speeds and shallow angles, the change in curvature may be small enough that any error introduced by non-instantaneous curvature change is acceptable.

With either advanced or limited path-planning autopilots, following a tractrix from an implement's point of initial contact with a desired path until the vehicle is established on the path provides a reliable method for establishing a front implement on a path without crossing the path and possibly damaging adjacent crop rows. Mathematically the tractrix approaches the desired path asymptotically but never touches it. Hence, "established" has the same sense here as "reached" or "online" mentioned earlier: the vehicle remains within some fixed error distance from the path. The required tractrix is parameterized by the implement length, F, ahead of the vehicle control point.

Figure 16:
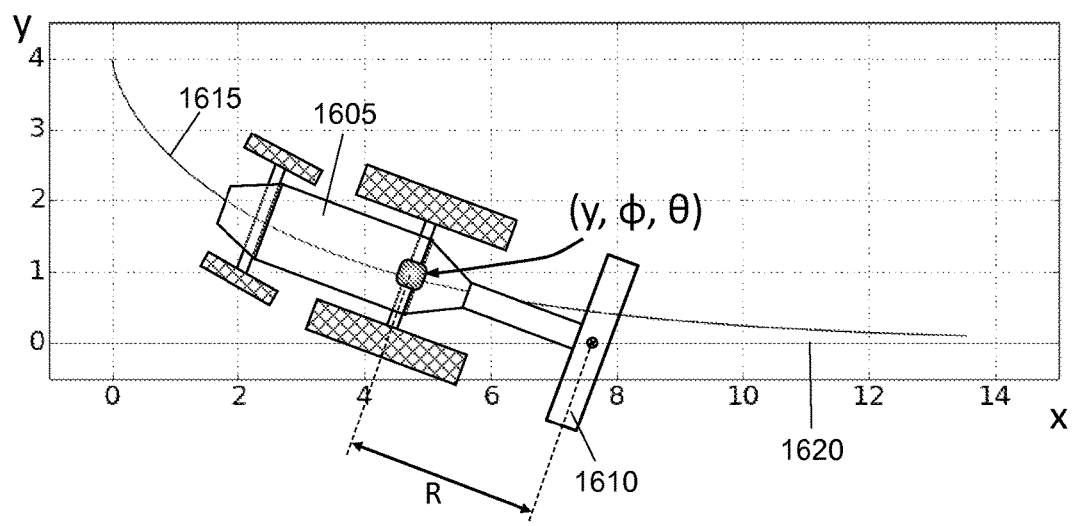
FIG. 16 shows a tractor with a fixed, rear implement leaving a path.

A tractrix also provides a useful vehicle path when departing from a straight line. For example, a tractrix provides a vehicle path that keeps a fixed, rear implement on a line as long as possible. FIG. 16 shows a tractor 1605 with a fixed, rear implement 1610 leaving a straight-line path 1620. A fixed, rear implement is one that extends from the rear of the vehicle, but always maintains the same heading, φ, as the vehicle. A fixed, rear implement is normally connected to a vehicle via a three-point hitch.

When tractor 1605 follows tractrix 1615, implement 1610 remains on line 1620 as long as possible. If the tractor follows the tractrix, the implement will stay on the line until the tractor's heading is parallel to the y-axis. After that point, the implement will depart the line. In practice, the tractor cannot follow the tractrix that far as it runs into practical steering angle and steering angle rate limits. Thus, in practice, the implement leaves the line before it has turned 90 degrees. Following a tractrix as long as practical, however, keeps the implement on line longer and keeps the implement from going on the opposite side of the line from the tractor and possibly damaging adjacent crop rows, for example. Whenever a path planning autopilot is available, therefore, a tractrix provides a useful path for a vehicle departing a line with a rear, fixed implement such as often happens when initiating end-of-row turns in agricultural operations. The tractrix in this case is parameterized by the fixed implement length, R, as shown in FIG. 16.

Figure 17:
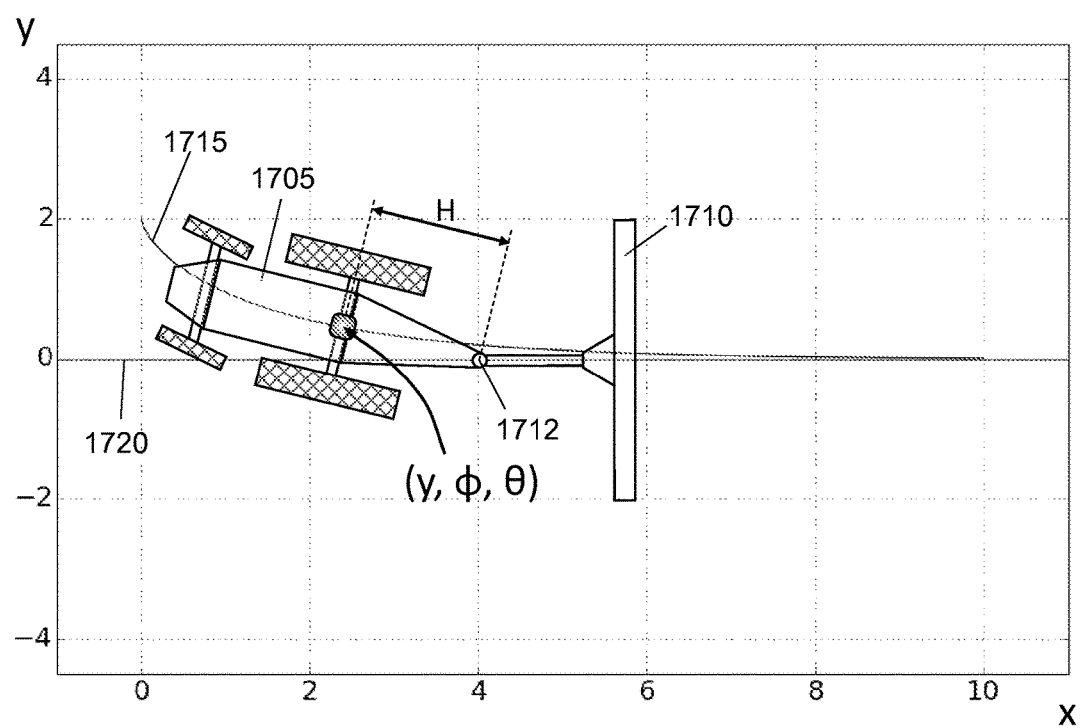
FIG. 17 shows a tractor leaving a straight-line path while towing an implement.

As a second example, a tractrix provides a vehicle path that keeps a towed, rear implement on a line as long as possible. FIG. 17 shows a tractor 1705 leaving a straight-line path 1720 while towing an implement 1710. When tractor 1705 follows tractrix 1715, hitch point 1712, and therefore implement 1710, remain on line 1720 as long as possible. If the tractor follows the tractrix, the hitch will stay on the line until the tractor's heading is parallel to the y-axis. After that point, the hitch point and implement will depart the line. In practice, the tractor cannot follow the tractrix that far as it runs into practical steering angle and steering angle rate limits. Thus, in practice, the hitch point leaves the line before the tractor has turned 90 degrees. Following a tractrix as long as practical, however, keeps the hitch point and implement on line longer and keeps the implement from going on the opposite side of the line from the tractor and possibly damaging adjacent crop rows, for example. Whenever a path planning autopilot is available, therefore, a tractrix provides a useful path for a vehicle departing a line while towing an implement such as often happens when initiating end-of-row turns in agricultural operations. The tractrix in this case is parameterized by the hitch length, H, as shown in FIG. 17.

In each of the maneuvers involving a tractrix, an autopilot guides a vehicle along a tractrix parameterized by a characteristic of an implement attached to the vehicle. The characteristic of the implement may be distance of the implement ahead of the vehicle's control point, implement length or hitch length, as examples.

Systems and methods for implement guidance have been described for towed and pushed implements. In the case of towed implements, efficient implement guidance to a desired path is achieved by guiding a towing vehicle toward a path on the opposite side of the desired path, then guiding the vehicle back to the desired path. In the case of pushed implements, a tractrix parameterized by implement geometry provides a suitable vehicle path. In both cases, vehicle guidance is customized to fit the requirements of a specific implement. A vehicle may also follow a tractrix when leaving a straight line path to keep a fixed or towed implement on the line as long as possible.

The systems and methods described above may be applied in a wide variety of agricultural and other situations. As an example, joining a straight path is a part of turning a vehicle and implement around at the end of one field row to join another row. All of the systems and methods described above may be implemented with the aid of modern microprocessor technology, and as such, can generate vehicle commands "on-the-fly". However, the case of turning around at the end of a field row is an example where a desired maneuver can be anticipated well in advance. In such cases, vehicle autopilots may use stored or pre-computed algorithms or vehicle paths instead of computing anew each time.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for guiding a towed implement to a desired path comprising:
   an autopilot guiding a vehicle towing the implement;
   the autopilot first guiding the vehicle across the desired path by an offset distance that is pre-determined for the vehicle and implement; and,
   the autopilot then guiding the vehicle back to the desired path.

2. The method of claim 1, the offset distance being stored in a memory accessible to the autopilot.

3. The method of claim 1 further comprising:
   the autopilot estimating the offset distance from implement behavior predicted by an implement model.

4. The method of claim 1, the offset distance being approximately 30% of implement length.

5. The method of claim 1, the vehicle and implement arriving at the desired path at the same time.

6. The method of claim 1, the autopilot guiding the vehicle toward an offset path, the offset path separated from the desired path by the offset distance.

7. The method of claim 6, the vehicle reaching the offset path at a point.

8. The method of claim 6, the vehicle staying on the offset path for a finite distance.

9. The method of claim 1, the implement never exceeding a specified maximum angle with respect to the vehicle.

10. The method of claim 1, the implement never exceeding a specified maximum curvature.

11. The method of claim 1, the implement never exceeding a specified maximum curvature rate.

12. The method of claim 1, the autopilot being a feedback autopilot.

13. The method of claim 12 the autopilot minimizing cross-track error.

14. The method of claim 13 the offset distance added to the cross-track error before the vehicle crosses the desired path.

15. The method of claim 1, the autopilot being a path-planning autopilot.

16. The method of claim 15 further comprising:
the autopilot planning a vehicle path to the desired path;
the autopilot estimating predicted implement displacement from the desired path at a point where the vehicle reaches the desired path; and,
the autopilot guiding the vehicle along a displaced vehicle path, the displaced vehicle path displaced from the desired path by the predicted implement displacement.

17. The method of claim 15 further comprising:
the autopilot planning a first vehicle path to an offset path, the offset path separated from the desired path by the offset distance, and first guiding the vehicle along the first vehicle path.

18. The method of claim 17, the first vehicle path having a non-zero curvature at the offset path, the curvature being determined in part by the offset distance.

19. The method of claim 17 further comprising:
the autopilot planning a second vehicle path from the offset path to the desired path and then guiding the vehicle along the second path.

20. The method of claim 19, the second vehicle path having zero curvature at the desired path.

21. The method of claim 17 further comprising:
the autopilot then guiding the vehicle back to the desired path using feedback.

22. The method of claim 17 further comprising:
the autopilot adjusting all paths uphill to compensate for sloping terrain.

23. A vehicle autopilot comprising:
a microprocessor and memory;
a GNSS receiver that provides vehicle position, velocity and time estimates to the microprocessor;
a feedback controller and a feed-forward controller that generate vehicle curvature commands to guide the vehicle; and,
a vehicle steering actuator; wherein,
the autopilot guides the vehicle while the vehicle tows an implement;
the autopilot programmed to first guide the vehicle across a desired path by an offset distance that is pre-determined for the vehicle and implement; and,
the autopilot programmed to then guide the vehicle back to the desired path.

24. The autopilot of claim 23 further comprising:
the autopilot programmed to estimate the offset distance from implement behavior predicted by an implement model.

25. The autopilot of claim 23, the offset distance being approximately 30% of implement length.

26. The autopilot of claim 23, the vehicle and implement arriving at the desired path at the same time.

\* \* \* \* \*